(12) United States Patent
Wada et al.

(10) Patent No.: US 10,001,696 B2
(45) Date of Patent: Jun. 19, 2018

(54) IMAGING APPARATUS

(71) Applicant: PANASONIC INTELLECTUAL PROPERTY MANAGEMENT CO., LTD., Osaka (JP)

(72) Inventors: Jyouji Wada, Kanagawa (JP); Yoshihito Urashima, Fukuoka (JP); Shinichiro Okamura, Fukuoka (JP); Akihiro Iizuka, Fukuoka (JP); Kouji Abe, Fukuoka (JP); Hideaki Yamada, Fukuoka (JP); Takashi Saitou, Fukuoka (JP); Hirofumi Sugi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days. days.

(21) Appl. No.: 15/296,487

(22) Filed: Oct. 18, 2016

(65) Prior Publication Data
US 2017/0115549 A1  Apr. 27, 2017

(30) Foreign Application Priority Data

Oct. 23, 2015 (JP) ................. 2015-208846

(51) Int. Cl.
G03B 15/16 (2006.01)
G03B 17/02 (2006.01)
G03B 17/56 (2006.01)

(52) U.S. Cl.
CPC ............. *G03B 15/16* (2013.01); *G03B 17/02* (2013.01); *G03B 17/561* (2013.01)

(58) Field of Classification Search
CPC ..................... G03B 13/1963; G03B 13/19632
See application file for complete search history.

(56) References Cited

U.S. PATENT DOCUMENTS

| | | | | |
|---|---|---|---|---|
| 5,347,307 A | * | 9/1994 | Tanaka ................. | G11B 31/006 348/372 |
| 5,963,749 A | * | 10/1999 | Nicholson ............ | F16M 11/105 396/421 |
| 2007/0019106 A1 | * | 1/2007 | Ibaraki ................... | F16M 11/10 348/373 |
| 2009/0309968 A1 | * | 12/2009 | Cheng .................... | H04N 7/183 348/143 |
| 2014/0043478 A1 | | 2/2014 | Burton | |
| 2014/0375745 A1 | * | 12/2014 | Hoelsæter ............ | G03B 17/561 348/14.01 |

FOREIGN PATENT DOCUMENTS

JP 2013-197966 9/2013
JP 1534280 S 10/2015

* cited by examiner

*Primary Examiner* — Noam Reisner
(74) *Attorney, Agent, or Firm* — Greenblum & Bernstein, P.L.C.

(57) ABSTRACT

An imaging apparatus includes a pan housing that is supported so as to be pan-rotatable about a pan-axis, a supporting arm of which a base end is supported by one end of the pan housing so as to be rotatable about a first tilt-axis which is spaced away from and perpendicular to the pan-axis, and a tilt housing which accommodates a camera, and of which one end side opposing the supporting arm is supported by a tip of the supporting arm so as to be rotatable about a second tilt-axis which extends in the same direction as the first tilt-axis extends.

17 Claims, 8 Drawing Sheets

IMAGING APPARATUS

BACKGROUND

1. Technical Field

The present disclosure relates to an imaging apparatus.

2. Description of the Related Art

A surveillance camera for outdoor use of which an imaging direction can be changed by driving a motor, and which can perform imaging at night is known (U.S. Unexamined Patent Application Publication No. 2014/0043478). A camera drive housing is fixed to a mounting base of the surveillance camera. An upper part of the camera drive housing can be pan-pivoted about a pan-axis by a mounted pan-shaft drive motor. Base ends of a pair of parallel tilt-supporting arms are fixed to the upper part of the camera drive housing. Tips of the pair of tilt-supporting arms support a camera housing therebetween. The camera housing is tilt-rotatable about a tilt-axis which is spaced away from and perpendicular to the pan-axis, and is fixed to the tips of the pair of tilt-supporting arms. The camera housing is tilt-rotated by a mounted tilt-drive motor.

A camera is mounted in the camera housing. A camera window is provided on the front surface of the camera housing in order to allow visible light and infrared light transmitted therethrough to be incident to the camera. In the camera housing, a wiper that wipes the camera window is provided so as to be rotatable by driving of the motor. In addition, an illumination housing is fixed to and integrated with the upper part of the camera housing. An illumination device is mounted in the illumination housing. The illumination device emits illumination light through an opening provided in the illumination housing. The opening in the illumination housing is covered with an illumination window. The illumination device emits the illumination light along an optical axis of a camera lens. By the camera housing and the illumination housing being integrated, the surveillance camera changes a direction of illumination light in accordance with a pan or tilt operation of the camera.

The surveillance camera according to U.S. Unexamined Patent Application Publication No. 2014/0043478 can image an area directly under the mounting base since the pair of tilt-supporting arms are disposed so as to be fixed to the camera drive housing at a predetermined angle. However, a rotation mechanism for tilt-rotating the camera housing is reserved in a space of both end portions opposing the tilt-supporting arms in the camera housing supported by the pair of tilt-supporting arms. Accordingly, the efficiency of using the space within the camera housing is deteriorated.

SUMMARY

In view of the above circumstances, the present disclosure provides an imaging apparatus that can image an area directly under or directly above the mounting base and can improve the efficiency of using a space in a housing that accommodates a camera.

The imaging apparatus according to the present disclosure includes a pan housing that is supported so as to be pan-rotatable about a pan-axis, a supporting arm of which a base end is supported by one end of the pan housing so as to be rotatable about a first tilt-axis which is spaced away from and perpendicular to the pan-axis, and a tilt housing which accommodates a camera, and of which one end side opposing the supporting arm is supported by a tip of the supporting arm so as to be rotatable about a second tilt-axis which extends in the same direction as the first tilt-axis extends.

According to the present disclosure, an area directly under or directly above the mounting base can be imaged, and the efficiency of using the space in the housing that accommodates the camera can be improved.

DETAILED DESCRIPTION

Figure 1:
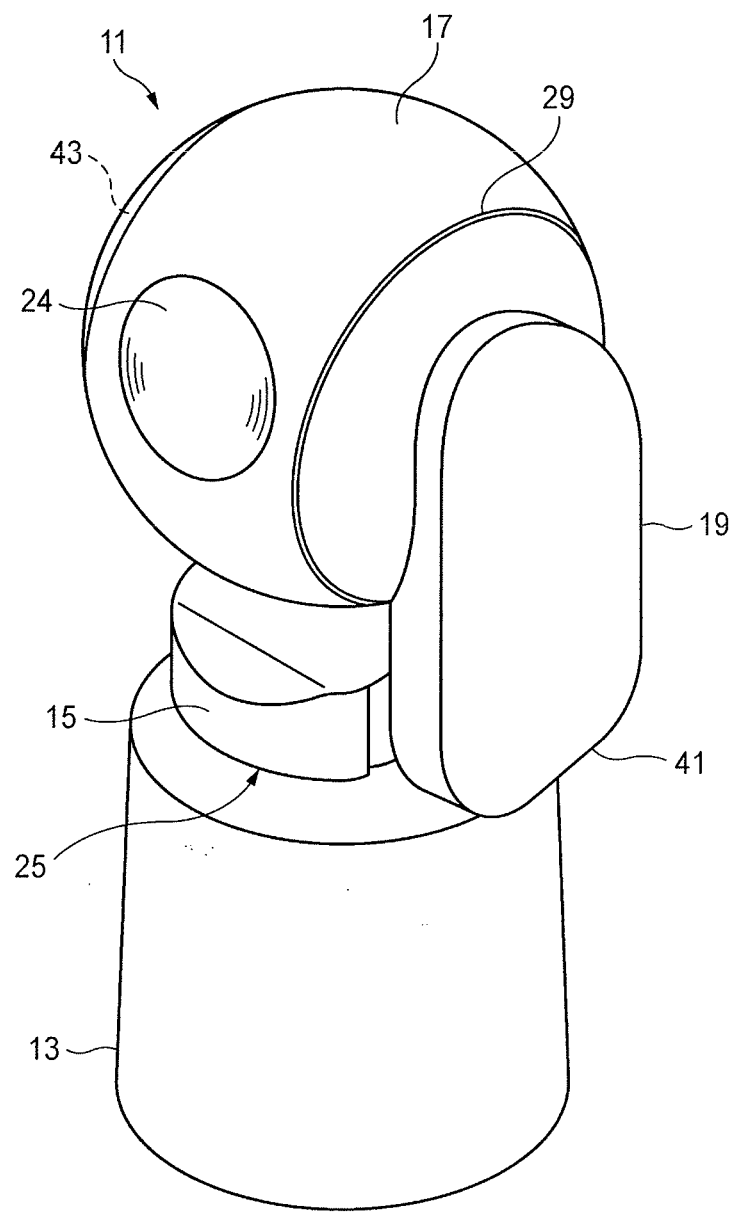
FIG. 1 is a perspective view illustrating an appearance of a surveillance camera according to a first exemplary embodiment.

Hereinafter, exemplary embodiments will be described in detail with reference to appropriate drawings. However, in some cases, needlessly detailed descriptions will not be made. For instance, in some cases, matters which are already well known will not be described in detail or practically the same configurations will not be described repeatedly. That is to avoid the following descriptions being needlessly long, and to promote understanding in those skilled in the art. The accompanying drawings and the following descriptions are provided to help those skilled in the art sufficiently understand the present disclosure. The drawing and the descriptions are not intended to limit the scope of the claims.

In the following exemplary embodiments, a surveillance camera that has two tilt-axes (tilt-shafts) will be described as an example of an imaging apparatus. In the exemplary embodiments below, a tilt-axis may be used as a term which refers to both a virtual axis (tilt-rotation center) and a physical tilt-shaft. Similarly, a pan-axis may be used a term which refers to both a virtual axis (pan-rotation center) and a physical pan-shaft.

First Exemplary Embodiment

[Configurations and the Like]

FIG. 1 is a perspective view illustrating an appearance of surveillance camera 11 according to a first exemplary embodiment.

Surveillance camera 11 includes main body housing 13, pan housing 15, and tilt housing 17. Main body housing 13 is a mounting base, and the lower surface thereof (surface on the lower side of FIG. 1) is a mounting surface. Main body housing 13 is, for example, substantially shaped into a cylinder of which a diameter on a mounting surface side is slightly larger than a diameter on a side opposite to the mounting surface side. The mounting surface of main body housing 13 of surveillance camera 11 is fixed to a fixing object by a fastener, such as a bolt.

Supporting arm 19 is attached to pan housing 15. Pan housing 15 is supported by an upper surface of main body housing 13 so as to be pan-rotatable about pan-axis Pc. Pan-axis Pc coincides with the axis of main body housing 13.

A side portion of pan housing 15 supports a base end of one supporting arm 19. That is, supporting arm 19 integrally pan-rotates with pan housing 15. Pan housing 15 supports the base end of supporting arm 19 so as to be rotatable about first tilt-axis T1c which is spaced away from and perpendicular to pan-axis Pc. In other words, supporting arm 19 is tiltable with respect to first tilt-axis T1c. Supporting arm 19 rises from pan housing 15, and a tip of supporting arm 19 supports tilt housing 17.

Tilt housing 17 is, for example, substantially shaped into a sphere. A part of spherical tilt housing 17 is cut out. In place of this part, the tip of supporting arm 19 is disposed. One end of tilt housing 17 in a diameter direction which is at the tip of supporting arm 19 is supported so as to be tilt-rotatable about second tilt-axis T2c which is parallel to first tilt-axis T1c.

For example, second tilt-axis T2c passes through spherical center 21 of tilt housing 17 which has a spherical shape. Tilt housing 17 is spaced upwardly away from pan housing 15, and is supported by supporting arm 19. In other words, tilt housing 17 is tilt-rotatable about two axes at the upper and lower ends of the supporting arm, one being first tilt-axis T1c and the other being second tilt-axis T2c. Accordingly, tilt housing 17 is able to be pushed out from pan housing 15 (moving in a direction of separating away from pan-axis Pc).

Figure 2:
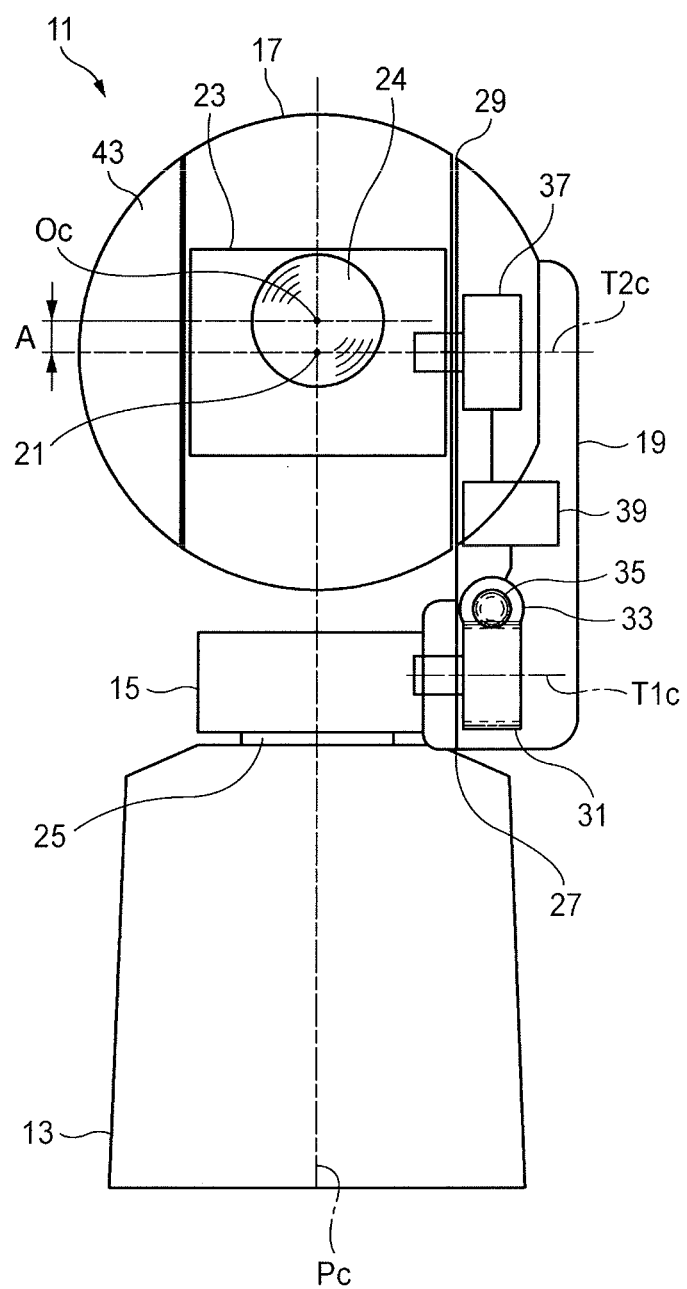
FIG. 2 is a front view of the surveillance camera illustrated in FIG. 1.

Tilt housing 17 accommodates camera 23 in the inside thereof (refer to FIG. 2). Camera 23 includes an imaging unit that has an image sensor or a lens. Camera 23 is disposed along optical axis Oc of the lens of camera 23 (not illustrated) in a direction of separating away from and perpendicular to second tilt-axis T2c.

The lens of camera 23 is covered with cover glass 24 provided in tilt housing 17. Optical axis Oc of camera 23 does not cross second tilt is T2c. That is, optical axis Oc of camera 23 is disposed on an opposite side of first tilt-axis T1c (pan housing 15) with second tilt-axis T2c being interposed therebetween when seen from a normal position illustrated in FIG. 1. Camera 23 is disposed at a position where optical axis Oc has shifted above second tilt-axis T2c (opposite side of pan housing 15). In other words, optical axis Oc of surveillance camera 11 is spaced upwardly away from second tilt-axis T2c at offset distance A (refer to FIG. 2).

Pan-rotation unit 25 is provided between main body housing 13 and pan housing 15, in surveillance camera 11. First tilt-rotation unit 27 is provided between pan housing 15 and supporting arm 19. Second tilt-rotation unit 29 is provided between supporting arm 19 and tilt housing 17.

Data regarding imaging information and a motor control signal for pan-rotation unit 25, first tilt-rotation unit 27, and second tilt-rotation unit 29 are transmitted through, for example, power-line communication (PLC) that is a non-contact type communication which uses an antenna.

Power is transmitted to pan-rotation unit 25 of surveillance camera 11 through, for example, a slip ring. In addition, power is transmitted to first tilt-rotation unit 27 and second tilt-rotation unit 29 through, for example, a twisted line.

Pan-rotation unit 25, first tilt-rotation unit 27, and second tilt-rotation unit 29 of surveillance camera 11 have a watertight structure. Pan-rotation unit 25, first tilt-rotation unit 27, and second tilt-rotation unit 29 have a waterproof structure where, for instance, a clearance between a shaft and a bearing is closed with a waterproof sealant that is in contact with both the shaft and the bearing. Accordingly, surveillance camera 11 can be used outdoors without a domed cover covering surveillance camera 11.

FIG. 2 is a front view of surveillance camera 11 illustrated in FIG. 1.

Surveillance camera 11 includes worm wheel 31 and first tilt-motor 33. Worm wheel 31 is fixed to any one of pan housing 15 and supporting arm 19. The axis of worm wheel 31 corresponds to first tilt-axis T1c. Herein, worm wheel 31 that is fixed to a pan housing 15 side is given as an example.

First tilt-motor 33 is fixed to the other one of pan housing 15 and supporting arm 19. In first tilt-motor 33, worm 35 that is fixed to a drive shaft meshes with worm wheel 31. Herein, first tilt-motor 33 that is fixed to supporting arm 19 is given as an example. Worm 35 and worm wheel 31 form a "worm gear" by both elements being combined with each other.

In surveillance camera 11, second tilt-motor 37 that rotates tilt housing 17 is provided at the tip of supporting arm 19. By the rotation of the drive shaft, second tilt-motor 37 rotates tilt housing 17 about second tilt-axis T2c with respect to supporting arm 19.

Controller 39 is provided in surveillance camera 11. Controller 39 may synchronize the rotations of second tilt-motor 37 and first tilt-motor 33. In synchronous rotation, first tilt-motor 33 and second tilt-motor 37 may rotate in the same direction at the same angular speed or at different angular speeds. In addition, in synchronous rotation, first tilt-motor 33 and second tilt-motor 37 may rotate in different directions at the same angular speed or at different angular speeds.

Figure 3:
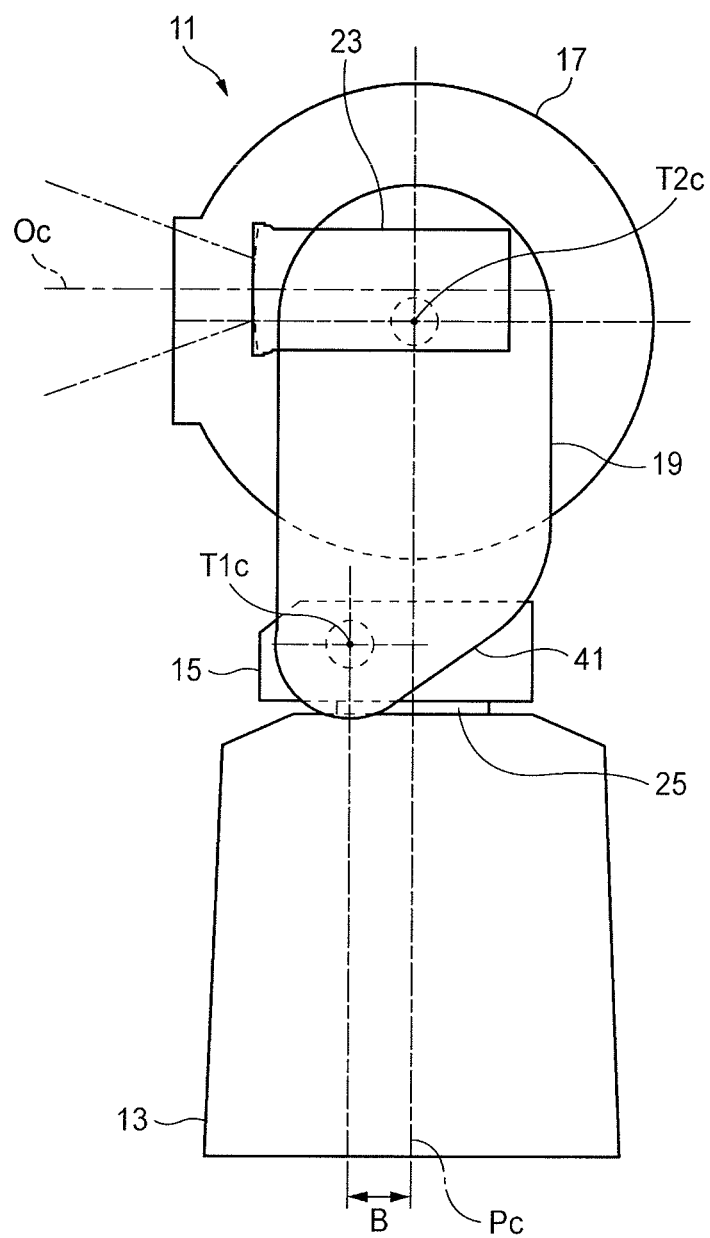
FIG. 3 is a side view of the surveillance camera illustrated in FIG. 1.

FIG. 3 is a side view of surveillance camera 11 illustrated in FIG. 1.

Along pan-axis Pc which is in a vertical direction, for example, main body housing 13 of surveillance camera 11 is fixed to an upper surface of the fixing object (for example, a floor) which is a horizontal surface. The fixing object may be a moving object, such as an automobile, in addition to a building. In the exemplary embodiment, this fixed position of surveillance camera 11 (position illustrated in FIG. 1) is referred to as a normal position.

When surveillance camera 11 is in the normal position, spherical center 21 of tilt housing 17 is positioned on pan-axis Pc. In this case, optical axis Oc of camera 23 is orthogonal to pan-axis Pc. An optical axis Oc direction at this time is referred to as the front in the exemplary embodiment.

Along pan-axis Pc which is in the vertical direction, main body housing 13 of surveillance camera 11 may be fixed to a lower surface of the fixing object (for example, a ceiling) which is a horizontal surface. In addition, when pan-axis Pc is in a horizontal direction, main body housing 13 of surveillance camera 11 may be fixed to the fixing object (for example, a side wall).

In surveillance camera 11, first tilt-axis T1c which is at the base end of supporting arm 19 is spaced away from pan-axis Pc at offset distance B toward the front. Accordingly, an amount by which tilt housing 17 is pushed out from pan housing 15 can be secured significantly by tilting tilt housing 17 in the direction where first tilt-axis T1c has been spaced away. As a result, surveillance camera 11 can easily monitor directly downward in particular.

The front side of supporting arm 19 (left side in FIG. 3) where first tilt-axis T1c is disposed hangs lower than the back side. In other words, the lower end portion of supporting arm 19 has slope 41 that starts from a point at which first tilt-axis T1c is disposed and that extends direction of separating in a direction of separating away from pan housing 15. Supporting arm 19 of surveillance camera 11 has slope 41, and thus slope 41 allows supporting arm 19 rotating in a direction of approaching pan housing 15 (tilting toward the back) while securing offset distance B. That is, interference of pan housing 15 is restricted by supporting arm 19 being provided with slope 41 when tilting toward the back.

Figure 4:
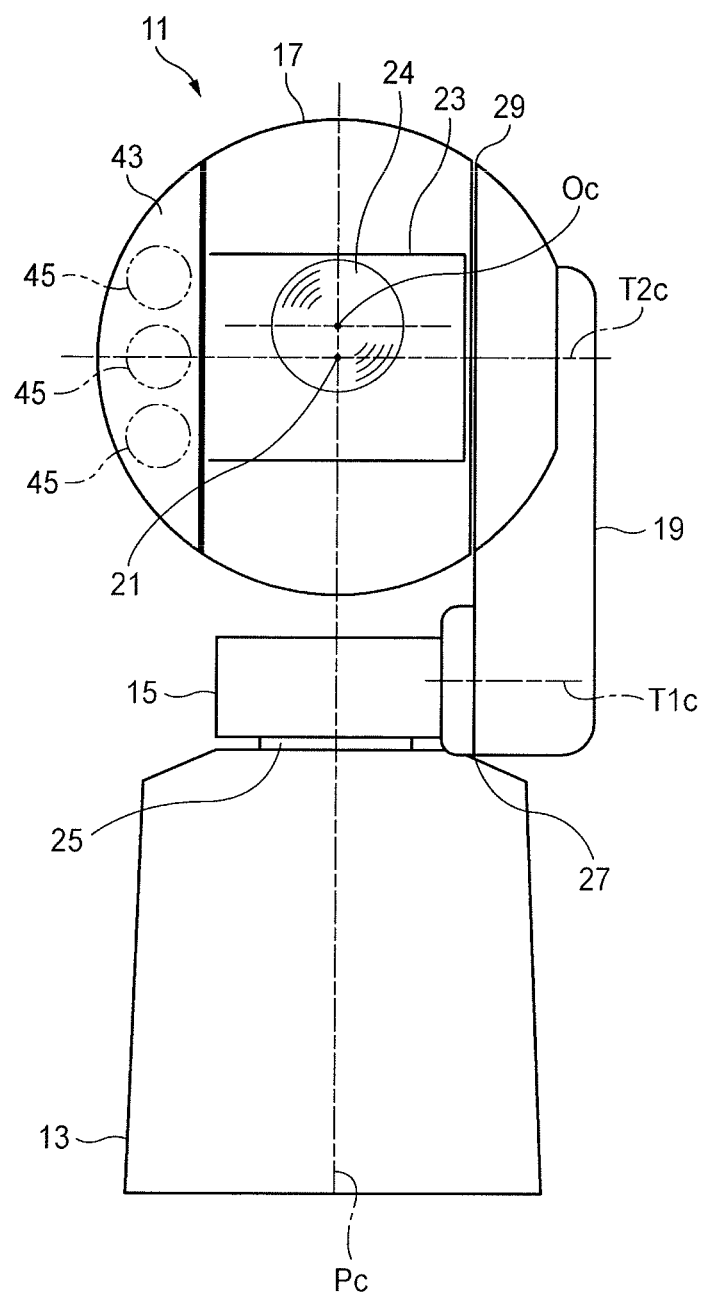
FIG. 4 is a front view of the surveillance camera in which an illumination device has been added within an auxiliary device addition space.

FIG. 4 is a front view of surveillance camera 11 in which illumination device 45 has been added within auxiliary device addition space 43.

Surveillance camera 11 includes auxiliary device addition space 43 in tilt housing 17. Auxiliary device addition space 43 is provided on the opposite side of supporting arm 19 with camera 23 being interposed therebetween and on the opposite side of camera 23 with a surface orthogonal to second tilt-axis T2c being interposed therebetween.

Auxiliary device addition space 43 allows an auxiliary imaging device to be accommodated. The auxiliary imaging device includes, for example, illumination device 45, a non-visible light camera (infrared camera or the like), or visible light camera. When surveillance camera 11 has standard specifications, for example, auxiliary device addition space 43 is a cavity. Illumination device 45 or the infrared camera can be attached within auxiliary device addition space 43 as an option. FIG. 4 illustrates a case where illumination device 45 (a plurality of LEDs) is attached as the auxiliary imaging device.

[Operation and the Like]

Hereinafter, operation of surveillance camera 11 will be described.

Figure 5:
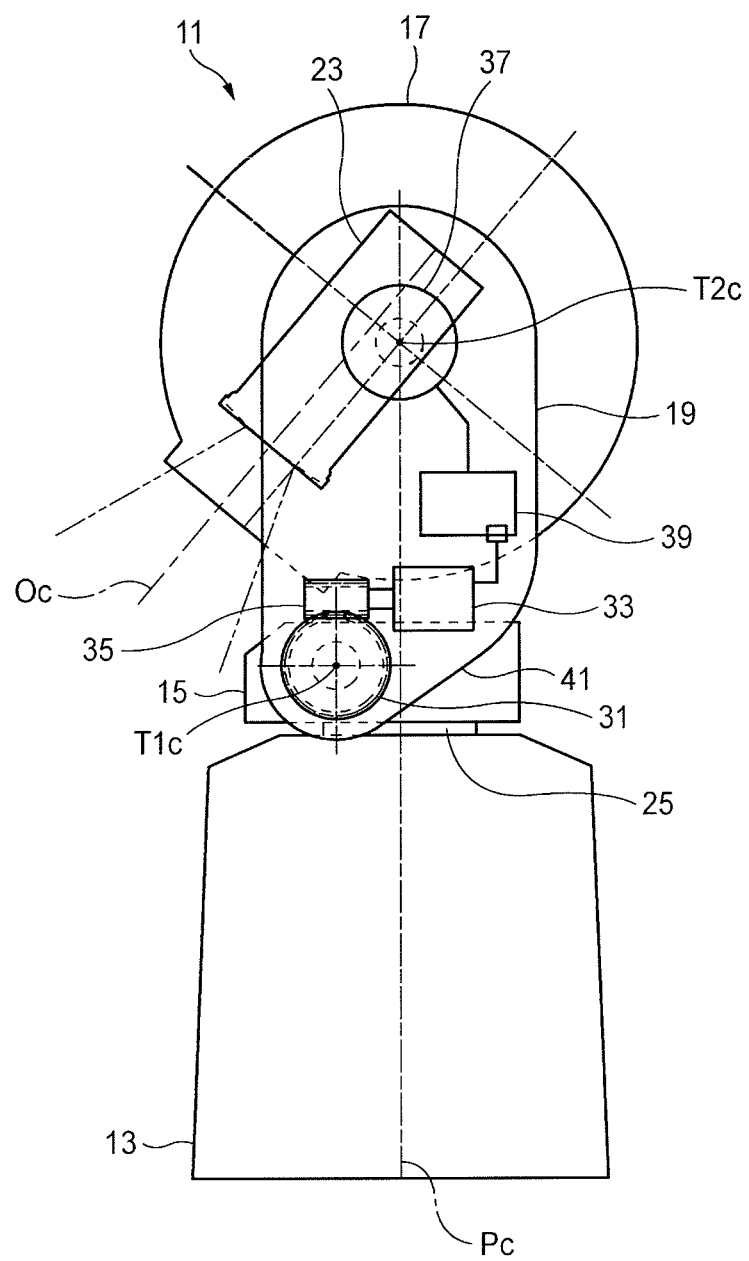
FIG. 5 is a side view of the surveillance camera of which a tilt housing has rotated.

FIG. 5 is a side view of surveillance camera 11 of which tilt housing 17 has rotated.

Optical axis Oc of camera 23 is angled obliquely downward once second tilt-motor 37 is driven and tilt housing 17 is rotated about second tilt-axis T2c counterclockwise when surveillance camera 11 is in the normal position. Meanwhile, once tilt housing 17 is rotated about second tilt-axis T2c clockwise, for example, optical axis Oc of camera 23 is angled obliquely upward.

Figure 6:
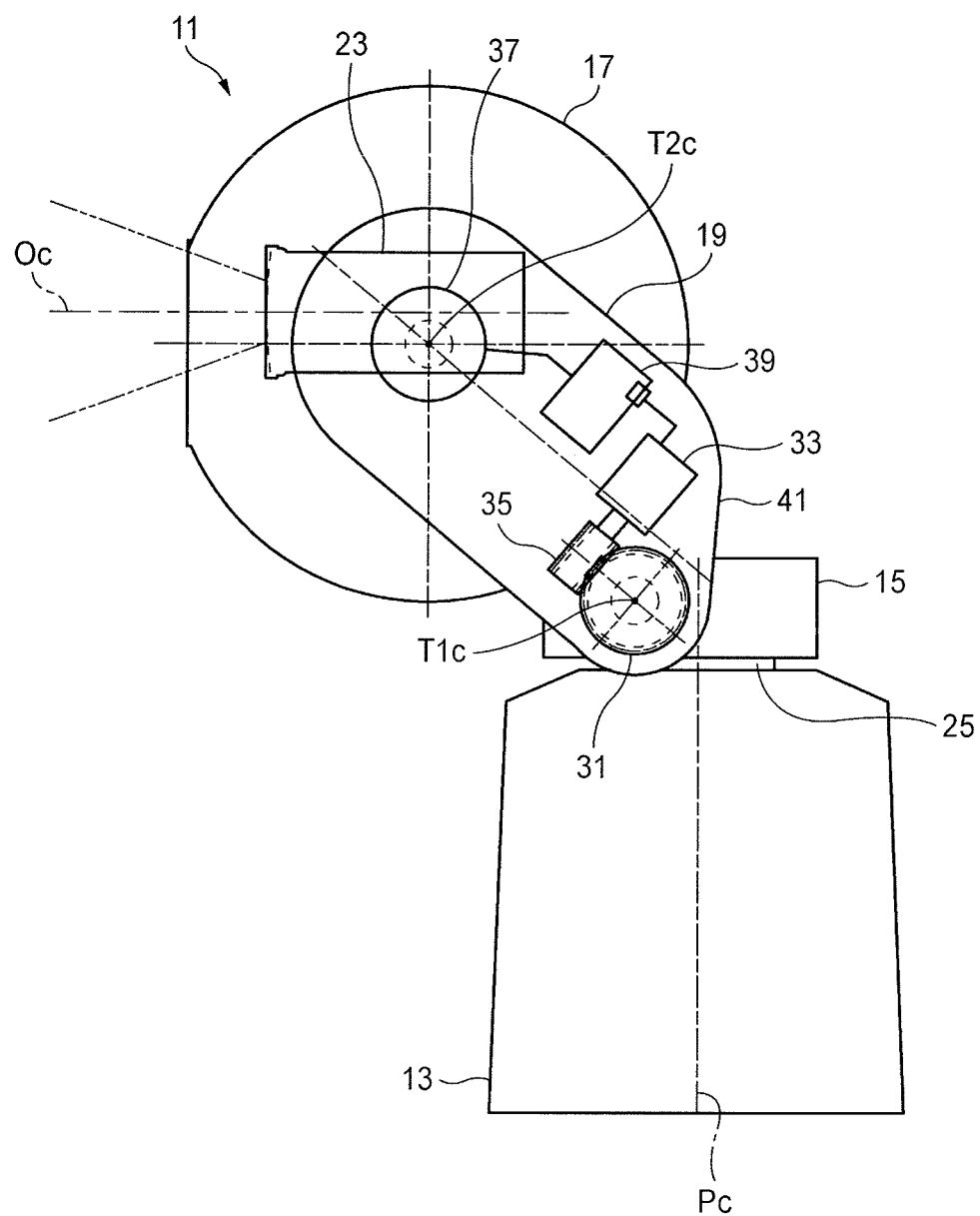
FIG. 6 is a side view of the surveillance camera of which a supporting arm has rotated about a first tilt-axis.

FIG. 6 is a side view of surveillance camera 11 of which supporting arm 19 has rotated about first tilt-axis T1c.

Once first tilt-motor 33 is driven and supporting arm 19 is rotated about first tilt-axis T1c counterclockwise when surveillance camera 11 is in the normal position, tilt housing 17 is pushed out toward the front. That is, supporting arm 19 tilts forward. At this time, second tilt-motor 37 may be synchronized by controller 39 and rotate reversely (in other words, rotate clockwise) with respect to supporting arm 19. Accordingly, optical axis Oc of camera 23 can maintain the same direction as at the time of normal position.

Figure 7:
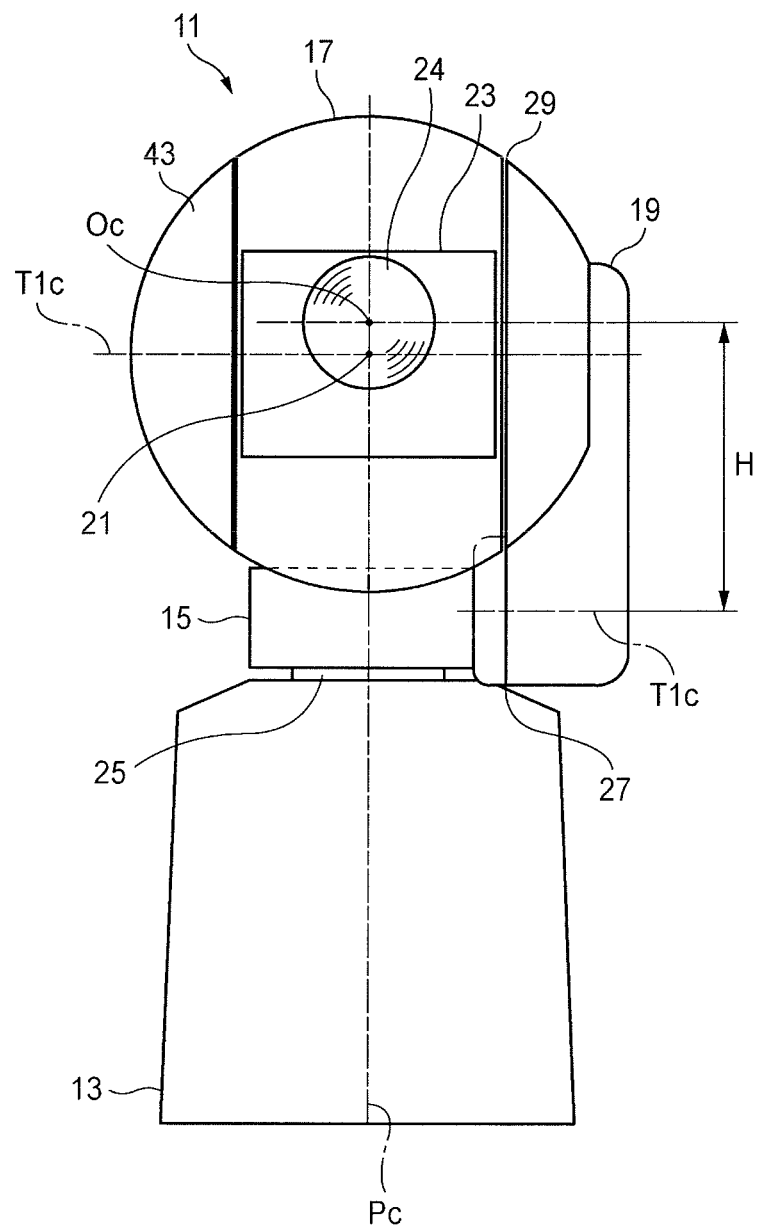
FIG. 7 is a front view of the surveillance camera illustrated in FIG. 6.

FIG. 7 is a front view of surveillance camera 11 illustrated in FIG. 6.

In a state where supporting arm 19 is tilted forward, surveillance camera 11 can move optical axis Oc of camera 23 down lower than at the time of normal position. That is, compared to the normal position, height H of optical axis Oc of camera 23 measured from first tilt-axis T1c can be reduced.

Figure 8:
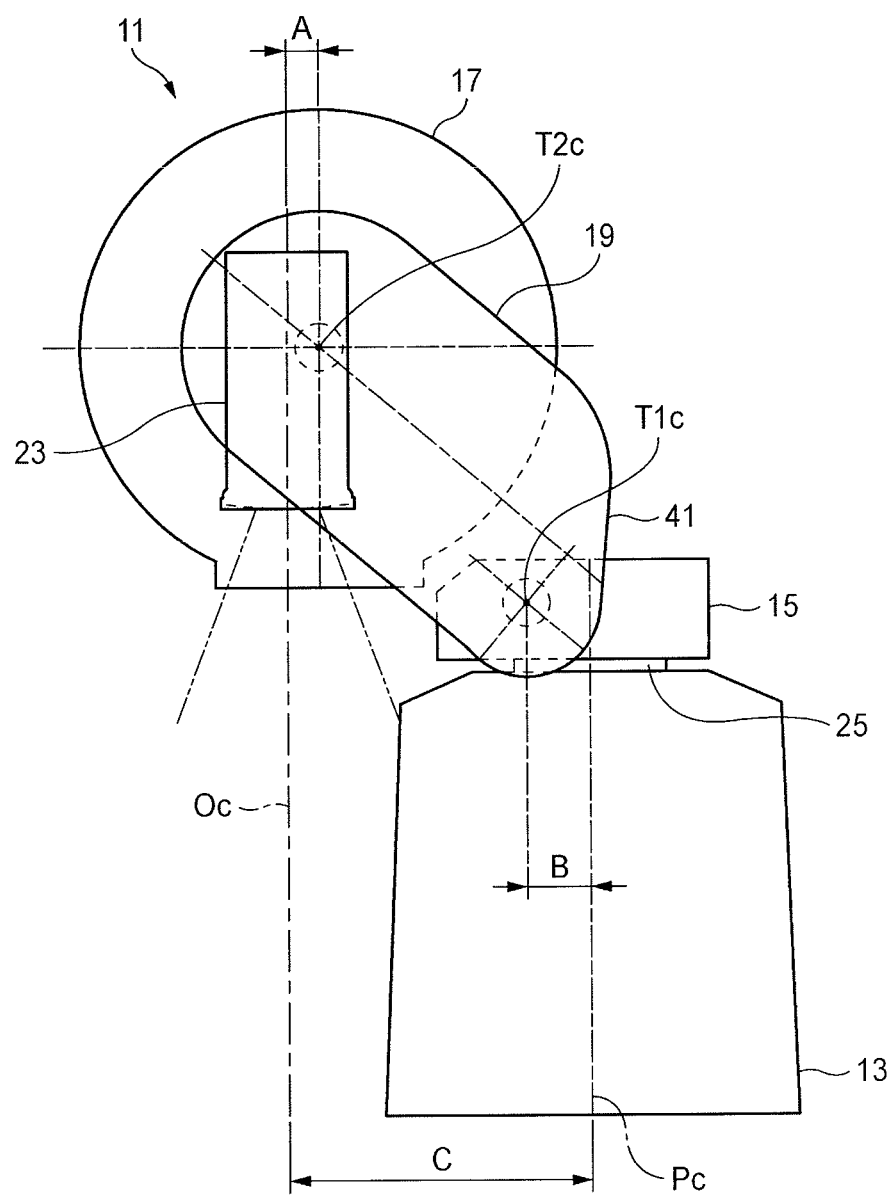
FIG. 8 is a side view of the surveillance camera of which a monitoring direction is directly downward.

FIG. 8 is a side view of surveillance camera 11 of which a monitoring direction is directly downward.

Once second tilt-motor 37 is driven and tilt housing 17 is rotated counterclockwise in FIG. 8 in a state where supporting arm 19 of surveillance camera 11 is tilted forward, optical axis Oc of camera 23 mounted in tilt housing 17 faces directly downward. At this time, in surveillance camera 11, optical axis Oc of camera 23 is spaced away from pan-axis Pc at offset distance C toward the front. Accordingly, camera 23 is pushed out to the outside of pan housing 15 and an area where the field of view is blocked by pan housing 15 decreases. As a result, the monitoring accuracy of surveillance camera 11 that watches directly downward can be improved.

[Effects and the Like]

Hereinafter, effects of surveillance camera 11 will be described.

In surveillance camera 11, the base end of supporting arm 19 is supported so as to be rotatable about first tilt-axis T1c that is at one end of pan housing 15 which is pan-rotatable. One end of tilt housing 17 is supported by the tip of supporting arm 19 such that tilt housing 17 is rotatable about second tilt-axis T2c. In other words, tilt housing 17 is supported, via one supporting arm 19, by pan housing 15 so as to be tilt-rotatable.

Since surveillance camera 11 has one supporting arm 19, the number of components can be reduced and the weight of surveillance camera 11 can be decreased compared to a structure of the related art provided with a pair of tilt-supporting arms. In addition, since supporting arm 19 opposes one end side of tilt housing 17 and supporting arm 19 is not disposed on the other end side of tilt housing 17, an option space (for example) is provided on the other end side of tilt housing 17. Therefore, surveillance camera 11 can efficiently use the space of tilt housing 17 that accommodates camera 23.

In addition, slop condition of supporting arm 19 or the optical axis Oc direction of camera 23 can be changed in stages since surveillance camera 11 has first tilt-axis T1c and second tilt-axis T2c. For instance, surveillance camera 11 is unlikely to receive wind pressure in the case of normal position since supporting arm 19 rises along pan-axis Pc. In addition, surveillance camera 11 is unlikely to receive wind pressure since tilt housing 17 is substantially shaped into a sphere. In addition, by supporting arm 19 being tilted forward and tilt housing 17 being rotated, surveillance camera 11 can easily image an area directly under or directly above main body housing 13.

In the surveillance camera of the related art, since tilt housing 17 is tilted forward and supported by the pair of tilt-supporting arms, the monitoring direction of camera 23 is easily noticed and thus crime-preventive effects diminish. In contrast, in surveillance camera 11, the monitoring direction of camera 23 is unlikely to be noticed in a case where supporting arm 19 is not tilted forward since spherical center 21 of tilt housing 17 can be disposed on pan-axis Pc. In other words, it is difficult to tell whether monitoring has been underway or not, and thus crime-preventive effects can be enhanced.

In addition, in surveillance camera 11, tilt housing 17 can be disposed (pushed out) in the direction of separating away from pan-axis Pc by supporting arm 19 being rotated about first tilt-axis T1c. Therefore, when tilt housing 17 is pushed out from pan housing 15, surveillance camera 11 can perform monitoring by watching directly downward or directly upward.

In addition, first tilt-axis T1c that is at the base end of supporting arm 19 is spaced away from pan-axis Pc. Accordingly, an amount by which tilt housing 17 is pushed out from pan housing 15 can be secured significantly by tilting tilt housing 17 in the direction where first tilt-axis T1c has been spaced away. As a result, surveillance camera 11 can easily monitor directly downward in particular.

In addition, when transporting surveillance camera 11, simplified packaging and miniaturization of surveillance camera 11 can be achieved by the center of tilt housing 17 being disposed on pan-axis Pc to position pan housing 15 and tilt housing 17 on a straight line.

In addition, when surveillance camera 11 is in the normal position, camera 23 is disposed on an opposite side of first tilt-axis T1c with second tilt-axis T2c being interposed therebetween. Optical axis Oc of camera 23 may be offset further to the upside than second tilt-axis T2c. In this case, tilt housing 17 of surveillance camera 11 is pushed out to the outside of pan housing 15 once supporting arm 19 is rotated about first tilt-axis T1c in a forward-tilting direction. At this time, camera 23 can obtain a larger pushed-out amount by an offset amount compared to a case where optical axis Oc coincides with second tilt-axis T2c. Therefore, monitoring, such as watching directly downward, can be easily performed.

In addition, in surveillance camera 11, worm wheel 31 of which the axis corresponds to first tilt-axis T1c is fixed to any one (for example, pan housing 15) of pan housing 15 and supporting arm 19. In this case, first tilt-motor 33 is fixed to the base end of supporting arm 19. In first tilt-motor 33, worm 35 which is fixed to the drive shaft meshes with worm wheel 31. Once first tilt-motor 33 is driven and worm 35 is rotated, worm 35 rotates along the outer circumference of worm wheel 31 which is fixed to pan housing 15. Accordingly, the base end of supporting arm 19 rotates about first tilt-axis T1c along with first tilt-motor 33 which is fixed to worm 35.

By being provided with worm 35 and worm wheel 31 (worm gear), the base end of supporting arm 19 prevents itself from being rotated by an external force. That is, the monitoring direction of tilt housing 17 can be restricted from being changed by an external force, such as a wind pressure, since a self-locking mechanism of the worm gear is provided.

In addition, in surveillance camera 11, since the drive shaft fixed to worm 35 is exposed to the outside, the base end of supporting arm 19 can be manually rotated about first tilt-axis T1c while maintaining the self-locking mechanism. That is, surveillance camera 11 can be operated electrically or manually while maintaining the self-locking mechanism.

In addition, in surveillance camera 11, for example, once first tilt-motor 33 is rotated and supporting arm 19 is rotated in the direction of pushing out from pan housing 15, optical axis Oc of camera 23 (monitoring direction) inclines, for example, in the forward-tilting direction. At this time, in surveillance camera 11, supporting arm 19 can be rotated by second tilt-motor 37 being driven synchronously in a reverse direction with respect to the rotation direction of first tilt-motor 33 while maintaining the monitoring direction of camera 23 at the same angular speed.

Accordingly, for example, in a case where an object to be monitored moves from the front to directly downward, the object to be monitored can be continuously monitored (without stopping supporting arm 19 in the middle of rotation). Therefore, surveillance camera 11 can restrict the deterioration of monitoring image quality and can smoothly follow the object to be monitored.

In addition, tilt housing 17 of surveillance camera 11 may be shaped into a partial sphere. The "partial sphere" is substantially a sphere of which a side is flat. The partial sphere is obtained by a sphere being cut by a plane, between camera 23 and supporting arm 19, orthogonal to first tilt-axis T1c. In place of the part of the sphere cut out of tilt housing 17 by the plane, a part of the tip of supporting arm 19 is provided so as to be integrated with tilt housing 17.

With camera 23 being interposed therebetween, the side of tilt housing 17 opposite to the tip of supporting arm 19 is auxiliary device addition space 43. For instance, in standard specifications, auxiliary device addition space 43 is a cavity that has a partial spherical shape. Since the auxiliary imaging device is attached within auxiliary device addition space 43, the auxiliary imaging device can support imaging conducted by camera 23.

Therefore, tilt housing 17 can be supported so as to be tilt-rotatable without a pair of tilt-supporting arms being provided in surveillance camera 11. In addition, surveillance camera 11 can monitor directly under and directly above where the mounting base is provided and can improve the efficiency of using a space within a housing that holds a camera.

Other Exemplary Embodiments

Hereinbefore, the first exemplary embodiment has been described as an example of the technique in the present disclosure. However, the technique in the present disclosure is not limited thereto. The technique in the present disclosure is applicable to exemplary embodiments in which changes, substitutions, additions, omissions or the like are made.

Although optical axis Oc of camera 23 which is offset from second tilt-axis T2c has been described as an example in the first exemplary embodiment, optical axis Oc of camera 23 may not be offset from second tilt-axis T2c.

In the first exemplary embodiment, rotating about first tilt-axis T1c with the worm gear being used has been described as an example. Rotation about first tilt-axis T1c may be performed with a gear other than a worm gear (for example, a helical gear) being used.

In the first exemplary embodiment, the controller may have any physical configurations. In addition, if a programmable controller is used, the degree of freedom in designing the controller can be enhanced since a change in a program results in a processing content change. The controller may be configured of one semiconductor chip or may be physically configured of a plurality of semiconductor chips. In a case where the controller is configured of a plurality of semiconductor chips, each control in the first exemplary embodiment may be realized by each of different semiconductor chips. In this case, it is possible to consider that one controller is configured of the plurality of semiconductor chips. In addition, the controller may be configured of a member (capacitor or the like) that has a function different from that of semiconductor chips. In addition, the controller may be configured of one semiconductor chip such that the function of controller and a function different from that of controller are realized. In addition, a plurality of controllers may be configured of one controller.

What is claimed is:

1. An imaging apparatus comprising:
   a pan housing that is supported so as to be pan-rotatable about a pan-axis;
   a supporting arm of which a base end is supported by one end of the pan housing so as to be rotatable about a first tilt-axis which is spaced away from and perpendicular to the pan-axis; and
   a tilt housing which accommodates a camera having an optical axis, and one end side of the tilt housing opposing the supporting arm is supported by a tip of the supporting arm so as to be rotatable about a second tilt-axis which extends in the same direction as the first tilt-axis extends, wherein
   when the imaging apparatus is in a normal position, the pan-axis intersects the second tilt axis, and the second tilt-axis is interposed between the optical axis of the camera and the first tilt-axis such that the optical axis of the camera is spaced away from and extends perpendicular to the second tilt-axis, and when the imaging apparatus is in the normal position, the first tilt axis is offset from the pan-axis at a position spaced from the pan-axis in a direction along the optical axis.

2. The imaging apparatus of claim 1, further comprising:
a worm wheel of which one side is fixed to any one of the pan housing and the supporting arm, and of which an axis corresponds to the first tilt-axis; and
a first tilt-motor to which the other one of the pan housing and the supporting arm is fixed, and in which a worm fixed to a drive shaft meshes with the worm wheel.

3. The imaging apparatus of claim 2, further comprising:
a second tilt-motor that is provided at the tip of the supporting arm and that rotates the tilt housing; and
a controller, wherein the second tilt-motor and the first tilt-motor are rotated synchronously by control of the controller.

4. The imaging apparatus of claim 1, wherein
the tilt housing has an auxiliary device addition space that can accommodate an auxiliary imaging device on a side opposite to the supporting arm with the camera being interposed between the auxiliary device addition space and the supporting arm.

5. The imaging apparatus of claim 1, wherein
when the imaging apparatus is in the normal position, the optical axis of the camera is offset from the second tilt axis at a position above the second tilt axis.

6. The imaging apparatus of claim 1, wherein
when the supporting arm is rotated about the first tilt-axis, the pan-axis does not intersect the second tilt-axis, and an offset length between the optical axis of the camera and the second tilt-axis is maintained.

7. The imaging apparatus of claim 1, wherein
when the tilt housing is rotated about the second tilt-axis, an offset length between the optical axis of the camera and the second tilt-axis is maintained.

8. The imaging apparatus of claim 1, wherein
when the imaging apparatus is in the normal position and the optical axis of the camera is substantially parallel to a mounting surface of the imaging apparatus, the first tilt-axis is positioned between a plane including the second tilt-axis and a plane including a surface of a cover lens which covers the camera and attached to the tilt housing.

9. The imaging apparatus of claim 1, wherein
when the imaging apparatus is in the normal position and the optical axis of the camera is substantially parallel to a mounting surface of the imaging apparatus, the first tilt-axis is positioned between a plane including the second tilt-axis and a plane including a front-most surface of the camera.

10. The imaging apparatus of claim 1, wherein
a shape of the tilt housing comprises at least part of a sphere.

11. The imaging apparatus of claim 1, wherein
the pan housing is connected to the tilt housing solely via the supporting arm.

12. An imaging apparatus comprising:
a pan housing that is pan-rotatable about a pan-axis;
a supporting arm that is rotatable about a first tilt-axis perpendicular to the pan-axis, and of which a first portion is physically connected with the pan housing; and
a tilt housing, accommodating a camera having an optical axis, that is rotatable about a second tilt-axis parallel to the first tilt-axis and perpendicular to the pan-axis, and physically connected with a second portion of the supporting arm, wherein
when the imaging apparatus is in a normal position, the pan-axis intersects the second tilt axis, and the second tilt-axis is interposed between the optical axis of the camera and the first tilt-axis such that the optical axis of the camera is spaced away from and extends perpendicular to the second tilt-axis, and
when the imaging apparatus is in the normal position, the first tilt axis is offset from the pan-axis at a position spaced from the pan-axis in a direction along the optical axis.

13. The imaging apparatus of claim 12, wherein
when the supporting arm is rotated about the first tilt-axis, the pan-axis does not intersect the second tilt-axis, and an offset length between the optical axis of the camera and the second tilt-axis is maintained.

14. The imaging apparatus of claim 12, wherein
when the tilt housing is rotated about the second tilt-axis, an offset length between the optical axis of the camera and the second tilt-axis is maintained.

15. The imaging apparatus of claim 12, wherein
when the imaging apparatus is in the normal position and the optical axis of the camera is substantially parallel to a mounting surface of the imaging apparatus, the first tilt-axis is positioned between a plane including the second tilt-axis and a plane including a surface of a cover lens which covers the camera and attached to the tilt housing.

16. The imaging apparatus of claim 12, wherein
when the imaging apparatus is in the normal position and the optical axis of the camera is substantially parallel to a mounting surface of the imaging apparatus, the first tilt-axis is positioned between a plane including the second tilt-axis and a plane including a front-most surface of the camera.

17. The imaging apparatus of claim 12, wherein
the pan housing is connected to the tilt housing solely via the supporting arm.

\* \* \* \* \*